INVENTOR.
JOSEPH F. McCORMICK

# United States Patent Office 3,516,441
Patented June 23, 1970

3,516,441
SUSPENSION ASSEMBLY FOR BOBBIN IN SERVO-VALVE
Joseph F. McCormick, Hingham, Mass., assignor to Delta Hydraulics Company, Braintree, Mass., a corporation of Massachusetts
Filed Oct. 12, 1967, Ser. No. 674,919
Int. Cl. F16k *11/02, 11/24*
U.S. Cl. 137—625.61        6 Claims

ABSTRACT OF THE DISCLOSURE

A servo-valve with a spool controlled by a pilot in turn controlled by a dynamic force motor having a moveable coil which carries the flapper valve of the pilot. A mechanical spring having a constant spring rate biases the flapper valve and coil to a neutral position.

---

This invention relates to servo-valves and more particularly comprises a new and improved suspension for the bobbin of an electro-dynamic force motor which operates the flapper valve assembly that acts as a pilot for the main control valve.

At the present time the bobbin assemblies of force motors used in servo-valves generally rely upon the force generated at the modulating orifice to null the displacement of the valve itself. Because the pressure changes at the orifice, this results in an effective change in the spring rate which opposes displacement of the valve, and the device therefore has no linearity with respect to the current directed through the coil. In other systems where coil springs are used to oppose displacement of the flapper valves, no fixed neutral point is established for the flapper valve because the spring is always under some compression.

One object of this invention is to provide a suspension for a bobbin assembly which will result in a proportional mechanical displacement of the coil assemblies with respect to the current which is directed through the coil.

Another object of this invention is to provide a suspension for an electrical bobbin assembly in the force motor of a servo-valve which establishes a fixed neutral position for the flapper valve.

Yet another object of this invention is to provide a support system for a bobbin assembly, which includes a mechanical spring having a known spring rate.

In accordance with the broadest aspects of this invention, it is an object to provide a servo-valve which is linearly responsive to electrical signal amplitude and polarity to control various outputs.

To accomplish these and other objects, the servo-valve of this invention includes a flapper valve assembly and a force motor mounted in the casing for controlling the position of the flapper valve. The bobbin of the force motor is supported between inner and outer pole pieces by a mechanical spring having a constant spring rate which biases the bobbin assembly into a preselected neutral position.

Figure 1:
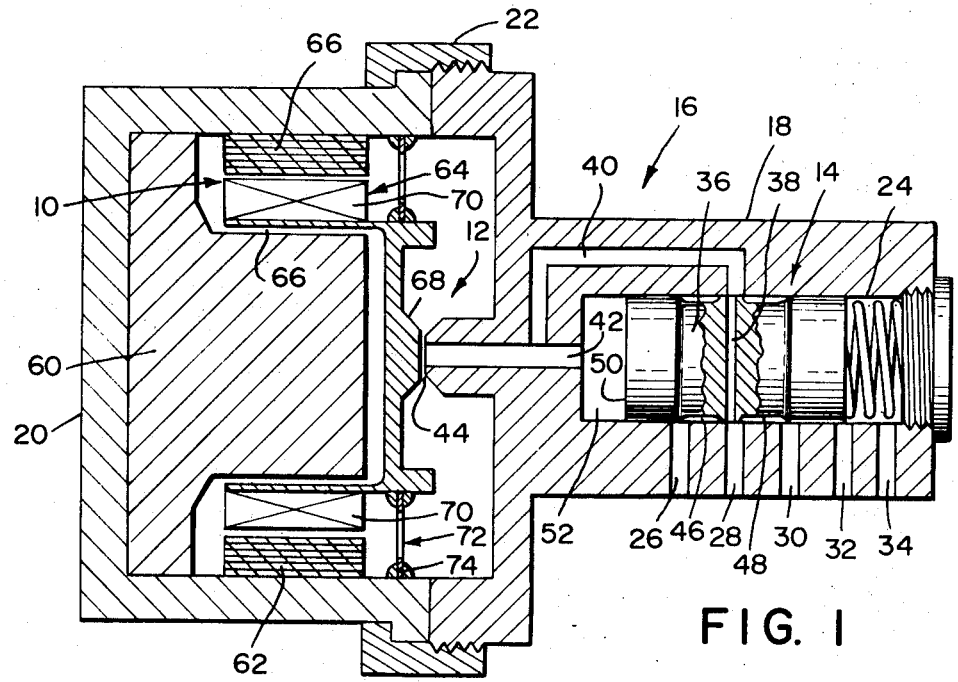
Figure 2:
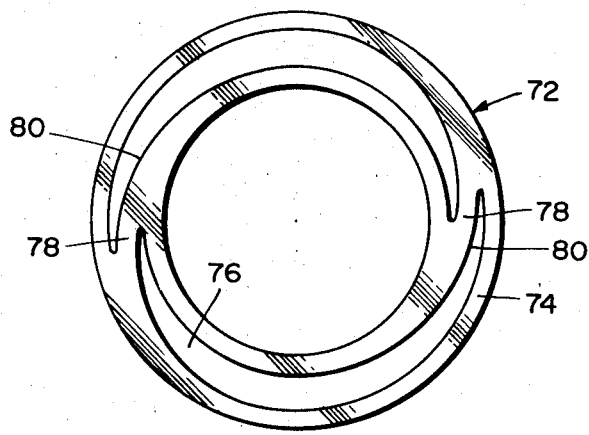
Figure 3:
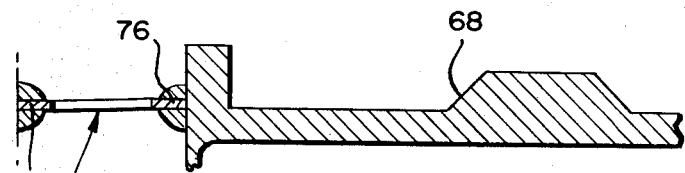

In the accompanying drawing:
FIG. 1 is a cross sectional view of a servo-valve constructed in accordance with this invention;
FIG. 2 is an enlarged fragmentary cross sectional view of the servo-valve shown in FIG. 1; and
FIG. 3 is a plan view of the mechanical spring assembly which supports the bobbin of the force motor of the servo-valve.

The servo-valve shown in FIG. 1 includes in its general organization an electro-dynamic force motor 10, a pilot valve assembly 12 and a four-way control valve 14. The force motor 10, pilot valve assembly 12, and control valve 14 are arranged within a case 16 composed of a main section 18 and a cap 20 secured together by a knurled locking collar 22.

The four-way control valve 14 includes a control chamber 24 in the main casing section 18, and a number of passages 26, 28, 30, 32 and 34 are oriented generally radially in the section and communicate with the chamber 24. Passages 26 and 30 are control passages which lead to the particular member being controlled, such as a double acting ram (not shown); passage 28 is the supply passage; passage 32 the exhaust passage; and passage 34 may be a pressure passage to vent the chamber 24. Disposed in the chamber 24 is a spool 36 which has a radial passage 38 extending through it which at all times connects the inlet passage 28 to the passage 40 also formed in the casing 18 and which in turn communicates with the passage 42 having a discharge orifice 44 at the pilot valve assembly 12. A pair of annular recesses 46 and 48 are formed in the spool 36, which are adapted to connect the inlet passage 28 to either one of the control passages 26 and 30, respectively. Thus, when the spool 36 moves to the left as shown in FIG. 1, the annular recess 48 will overlap the edge of the inlet 28 and bring it into communication with the discharge passage 30. On the other hand, when the spool 36 has moved to the right as viewed in that figure, the annular recess 46 in the spool will place the inlet 28 in communication with the control passage 26.

The spool 36 is displaced in the chamber 24 by fluid pressure applied against its left end 50 by means of the subchamber 52 formed on its left. The subchamber 52 is in direct communication with the passage 42, and the pressure therefore in the chamber 52 which controls the position of the spool is in turn a function of the pressure at the inlet passage 28 and the orifice 44 of the pilot valve assembly 12.

The force motor 10 is disposed in the cap 20 and includes an inner pole piece 60 and an outer pole piece 62, each fixed with respect to one another in the cap.

A moveable bobbin assembly 64 is disposed in the gap 66 between the inner and outer pole pieces 60 and 62, and the bobbin assembly carries a flapper valve 68 which controls the size of the orifice 44 at the pilot. As the coil assembly 64 moves in the gap 66 toward and away from the orifice 44, the flapper valve 68 moves toward and away from the orifice with it and varies the orifice size. The bobbin 64 carries the coil windings 70, and under well known principles, energization of the coil 70 causes the bobbin 64 to displace, and the flapper valve 68 displaces with it.

The bobbin assembly 64 is supported in a neutral position in the gap 66 by a spring assembly 72. The spring is made of beryllium copper or some similar material having a long life and great flexibility. The periphery of the spring is spun into supporting ring 74 which is secured to the cap of the casing. As shown in FIG. 3, the spring is composed of a central ring 76 (which is secured to the bobbin 64), a number of arms 78 which extend from the inner to the outer ring and the outer support ring 74. The central ring 76 preferably is made separately as is the support ring 74, and thereafter the central ring may be spun over the inner edge of the spring. It is evident that the ring may have its own central annulus to which the central or inner ring 76 is secured. The arms 78 as shown in the drawing do not extend directly radially from the inner ring 76 to the outer ring 74, but rather are curved or S-shaped so as to increase their effective length. The increased length of the arms 78 increases the flexibility (decreases the stiffness) of the spring to allow mechanical displacement of the bobbin under the force generated by energization of the coil 70. The spring assembly 72 which includes the inner ring 76 and the periphery 80 spun into the support ring 74 may be stamped or otherwise formed from sheet material. While only two arms 78 are shown, it is evident that two or more arms may be used, depending upon the desired stiffness.

When the bobbin 64 is in its neutral position, the arms 78 lie in a plane perpendicular to the bobbin axis, but when the bobbin is displaced under the influence of a force generated by energization of the coil 70, the arms 78 displace at their inner ends so as to generally generate a cone configuration.

Springs of the character described have a constant spring rate and provide the neutral position desired for the bobbin. The neutral position may be determined and fixed, and such a spring is particularly suitable for mass production of valves of the type described having electrodynamic force motors with movable bobbins. It is considerably easier to establish a neutral position employing such a spring than with a coil spring or some other form of spring device. By use of the type of spring shown it is unnecessary to specially calibrate each particular instrument. If the arms 78 are in fact co-planar, the neutral position of the bobbin can be predetermined by connecting the inner ring 76 to a set position on the bobbin and the support ring 74 to a set position in the cap.

What is claimed is:
1. A servo-valve comprising
    a casing having a chamber and a spool mounted in and moveable in the chamber,
    a pilot orifice connected to the chamber on one end of the spool and a passage connected to the pilot orifice for placing the orifice in communication with a pressure source,
    a flapper valve means mounted in the casing adjacent the orifice for varying the orifice size to control the pressure exerted against the end of the spool to move it in the chamber,
    a force motor mounted in the casing and having a moveable coil assembly that includes the flapper valve,
    and a spring connected to the casing about its periphery and to the coil assembly at the center and having a constant spring rate through its operative range and supporting the coil assembly in a neutral position from which the flapper valve may move toward and away from the orifice in response to changes in the amplitude and polarity of the signal impressed on the coils.
2. A servo-valve as described in claim 1 further characterized by
    said spring being disposed in a plane perpendicular to the direction of movement of the coil assembly.
3. A servo-valve as described in claim 1 further characterized by
    said spring having a plurality of arms that extend in a radial direction from the coil assembly, the inner ends of the arms being secured to the coil assembly and the outer ends to the casing.
4. A servo-valve as described in claim 2 further characterized by
    said spring having an inner and outer ring, and a plurality of flexible arms interconnecting the two rings,
    said arms being curved to extend non-radially from the inner to the outer ring to increase their effective length.
5. A servo-valve as described in claim 4 further characterized by
    a support ring clamped onto each side of the outer ring of the spring and connected to the casing,
    an inner support ring clamped onto each side of the inner ring of the spring, said inner support ring being secured to the coil assembly.
6. A servo-valve as described in claim 5 further characterized by
    said spring being made of beryllium copper.

References Cited

UNITED STATES PATENTS

| | | | |
|---|---|---|---|
| 2,556,816 | 6/1951 | Lukacs | 179—115.5 XR |
| 2,625,136 | 1/1953 | Moog | 137—625.61 |
| 2,904,075 | 9/1959 | Markson | 137—625.63 XR |
| 3,001,549 | 9/1961 | Nelson et al. | 251—139 XR |
| 3,126,026 | 3/1964 | Moore | 137—85 |

HENRY T. KLINKSIEK, Primary Examiner

U.S. Cl. X.R.

137—625.64; 179—115.5; 310—15, 26; 91—47